US012694605B2

(12) United States Patent
Rabbani Rankouhi et al.

(10) Patent No.: US 12,694,605 B2
(45) Date of Patent: Jul. 28, 2026

(54) BOUNDING VOLUME HIERARCHY WITH BOUNDING VOLUMES IN PRIOR SPACE CORRESPONDING TO SUBSET OF TRANSFORM SUB-TREE BOUNDS

(71) Applicant: Apple Inc., Cupertino, CA (US)

(72) Inventors: Ali Rabbani Rankouhi, Bushey (GB); David J. Bermingham, Cambridge (GB)

(73) Assignee: Apple Inc., Cupertino, CA (US)

( * ) Notice: Subject to any disclaimer, the term of this patent is extended or adjusted under 35 U.S.C. 154(b) by 141 days.

(21) Appl. No.: 18/405,191

(22) Filed: Jan. 5, 2024

(65) Prior Publication Data

US 2025/0095272 A1     Mar. 20, 2025

Related U.S. Application Data

(60) Provisional application No. 63/584,025, filed on Sep. 20, 2023.

(51) Int. Cl.
G06T 15/06 (2011.01)
G06T 17/00 (2006.01)

(52) U.S. Cl.
CPC ............ G06T 15/06 (2013.01); G06T 17/005 (2013.01); *G06T 2210/21* (2013.01)

(58) Field of Classification Search
CPC .... G06T 15/06; G06T 17/005; G06T 2210/21
See application file for complete search history.

(56) References Cited

U.S. PATENT DOCUMENTS

| | | | |
|---|---|---|---|
| 9,805,495 B2 | 10/2017 | Obert et al. | |
| 11,450,057 B2 | 9/2022 | Muthler et al. | |
| 11,508,112 B2 | 11/2022 | Muthler et al. | |
| 11,521,343 B2 | 12/2022 | Potter et al. | |
| 11,663,770 B2 | 5/2023 | Muthler et al. | |
| 11,676,327 B2 | 6/2023 | Burns et al. | |
| 2013/0113800 A1* | 5/2013 | McCombe .............. G06T 15/08 |
| | | | 345/424 |
| 2016/0292908 A1* | 10/2016 | Obert .................... G06T 15/005 |
| 2019/0318445 A1* | 10/2019 | Benthin ................ G06T 15/005 |
| 2021/0390756 A1* | 12/2021 | Muthler ................ G06T 17/005 |
| 2021/0407176 A1* | 12/2021 | Riguer ................... G06T 15/08 |
| 2022/0020201 A1* | 1/2022 | Fenney ................. G06T 15/506 |
| 2022/0036652 A1* | 2/2022 | Rabbani Rankouhi ..................... |
| | | | G06F 9/4881 |

(Continued)

*Primary Examiner* — Kent W Chang
*Assistant Examiner* — Karl Duc Truong
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to ray tracing, e.g., in graphics processors. Ray tracing embodiments may utilize a bounding volume hierarchy (BVH) acceleration data structure (ADS) that includes a hierarchy of bounding volumes. A graphics processor may traverse the ADS, testing for intersections with bounding volumes, to determine which primitives to test for a given ray. Some nodes may be transform nodes (e.g., instance nodes) that correspond to a ray transform before further traversal. In disclosed embodiment, one or more levels below the transform node may be reverse transformed and included above the transform node. This may advantageously avoid a ray transform operation for rays that would not have hit in the first one or more levels of the transform sub-tree.

20 Claims, 10 Drawing Sheets

(56)                    References Cited

U.S. PATENT DOCUMENTS

| | | | |
|---|---|---|---|
| 2022/0148249 A1* | 5/2022 | Potter | ....................... G06T 1/60 |
| 2022/0392148 A1 | 12/2022 | Muthler et al. | |
| 2024/0087211 A1* | 3/2024 | Muthler | ................. G06T 15/06 |
| 2024/0212259 A1* | 6/2024 | Pankratz | ................. G06T 15/06 |

* cited by examiner

Processing
Flow 100

Vertex Data

Graphics
Unit
150

*Example object for which an instance sub-tree may be generated*

*Multiple instances of object included in world space, transform ray to instance space on reaching one of the instances*

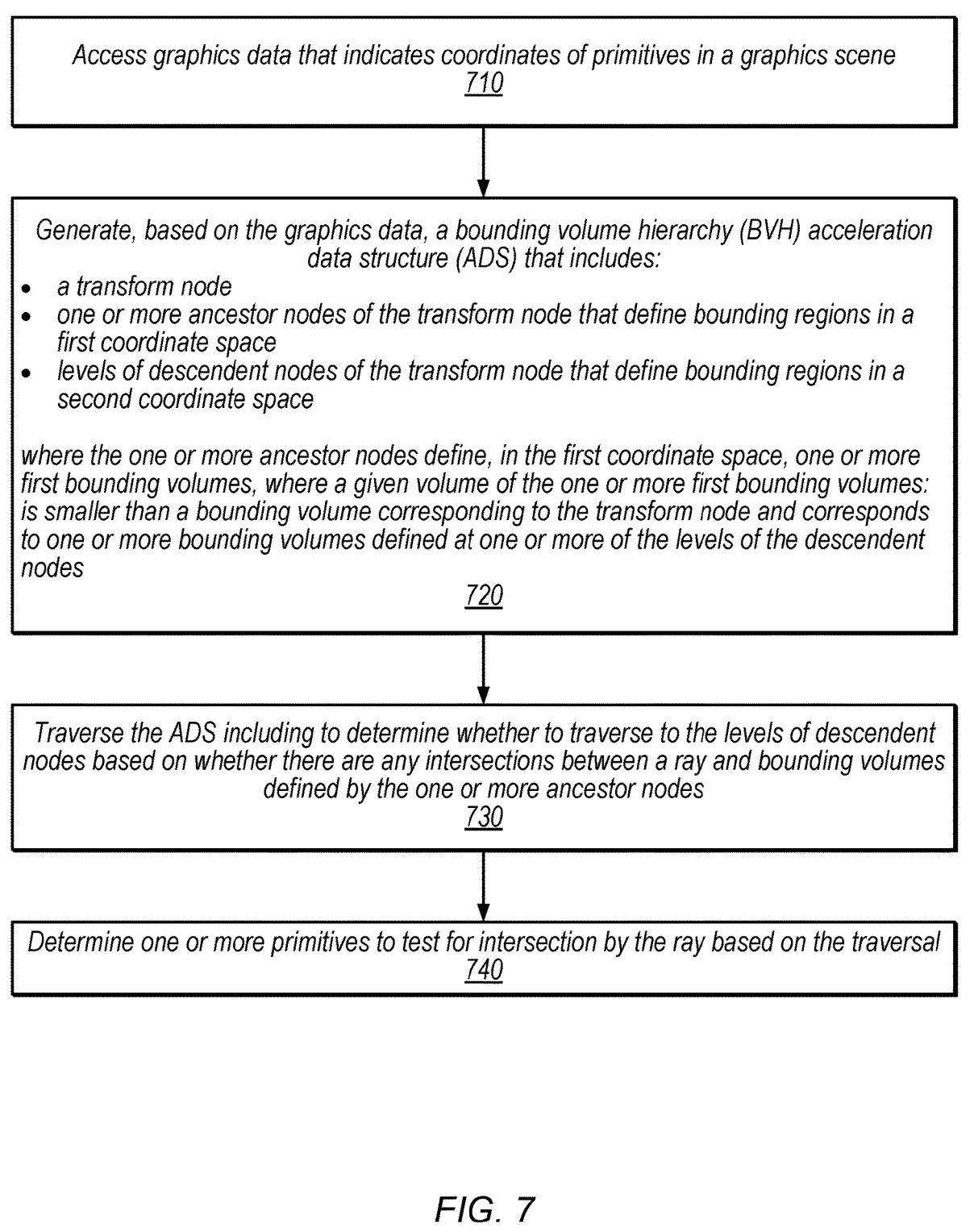

*Access graphics data that indicates coordinates of primitives in a graphics scene*
*710*

*Generate, based on the graphics data, a bounding volume hierarchy (BVH) acceleration data structure (ADS) that includes:*
- *a transform node*
- *one or more ancestor nodes of the transform node that define bounding regions in a first coordinate space*
- *levels of descendent nodes of the transform node that define bounding regions in a second coordinate space*

*where the one or more ancestor nodes define, in the first coordinate space, one or more first bounding volumes, where a given volume of the one or more first bounding volumes: is smaller than a bounding volume corresponding to the transform node and corresponds to one or more bounding volumes defined at one or more of the levels of the descendent nodes*
*720*

*Traverse the ADS including to determine whether to traverse to the levels of descendent nodes based on whether there are any intersections between a ray and bounding volumes defined by the one or more ancestor nodes*
*730*

*Determine one or more primitives to test for intersection by the ray based on the traversal*
*740*

*FIG. 7*

BOUNDING VOLUME HIERARCHY WITH BOUNDING VOLUMES IN PRIOR SPACE CORRESPONDING TO SUBSET OF TRANSFORM SUB-TREE BOUNDS

CROSS REFERENCE TO RELATED APPLICATIONS

The present application claims priority to U.S. Provisional App. No. 63/584,025, entitled "Bounding Volume Hierarchy with Bounding Regions in Prior Space for Subset of Transform Sub-Tree Bounds," filed Sep. 20, 2023, the disclosure of which is incorporated by reference herein in its entirety.

BACKGROUND

Technical Field

This disclosure relates generally to computer graphics processors and more particularly to ray tracing.

Description of Related Art

In computer graphics, ray tracing is a rendering technique for generating an image by tracing the path of light as pixels in an image plane and simulating the effects of its encounters with virtual objects. Ray tracing may allow resolution of visibility in three dimensions between any two points in the scene, which is also the source of most of its computational expense. A typical ray tracer samples paths of light through the scene in the reverse direction of light propagation, starting from the camera and propagating into the scene, rather than from the light sources (this is sometimes referred to as "backward ray tracing"). Starting from the camera has the benefit of only tracing rays which are visible to the camera. This system can model a rasterizer, in which rays simply stop at the first surface and invoke a shader (analogous to a fragment shader) to compute a color. More commonly secondary effects—in which the exchange of illumination between scene elements, such as diffuse inter-reflection and transmission—are also modeled. Shaders that evaluate surface reflective properties may invoke further intersection queries (e.g., generate new rays) to capture incoming illumination from other surfaces. This recursive process has many formulations, but is commonly referred to as path tracing.

Graphics processors (GPUs) that implement ray tracing typically provide more realistic scenes and lighting effects, relative to traditional rasterization systems. Ray tracing is typically computationally expensive, however. Improvements to ray tracing techniques may improve realism in graphics scenes, improve performance (e.g., allow tracing of more rays per frame, tracing in more complex scenes, or both), reduce power consumption (which may be particularly important in battery-powered devices), etc.

In typical ray tracing implementations, the graphics processor traverses a bounding volume hierarchy (BVH) acceleration data structure (ADS) to determine which primitives (e.g., triangles) in a scene are to be tested for intersection with the ray. This substantially reduces the number of ray-primitive intersection tests for a given render (e.g., relative to testing every ray against every primitive).

"Instancing" is a common graphics technique in which parameters for an object or mesh are defined once and then instantiated multiple times in a graphics scene. Rather than including each instance of the object in the ADS for racy tracing, an instanced object typically may have one "instance sub-tree" in the ADS. On reaching an instance node (the origin of an instance sub-tree), the GPU may transform the ray from world space to an instance space of a specific instance for further traversal. This may substantially reduce the size of the ADS (relative to replicating the sub-tree at different locations in the ADS for different instances).

BRIEF DESCRIPTION OF DRAWINGS

FIG. 7 is a flow diagram illustrating an example method of generating and traversing an ADS, according to some embodiments.

DETAILED DESCRIPTION

As discussed above, transforming coordinates of a ray (e.g., adjusting its origin X, Y, and Z coordinate values, direction, or both to transform the ray to an instance coordinate space) may utilize processing resources. For example, in some embodiments the ray is transformed by a shader program (which may be referred to as a "clique-S" type of single-instruction multiple-data (SIMD) group). This may consume power and use shader pipelines that could be used by other work. In other embodiments, dedicated ray transform circuitry may be configured to transform ray coordinates, which may also consume power and may increase chip area based on the number of transforms supported in parallel. On the other hand, ADS's that do not use instancing may become very large.

In certain situations, a number of rays do not hit in any bounding boxes in one or more levels of the first few levels of the instance sub-tree, before reaching any primitive children. In this case, the processing resources used to transform such rays were unnecessary because no primitive tests were generated during traversal of the sub-tree.

Therefore, in disclosed embodiments, bounding boxes from one or more initial levels of a transform sub-tree (e.g., instance sub-tree) are included above the instance sub-tree in the ADS, with coordinates defined in the parent space (e.g., world space). Therefore, a given bounding box may be included in the ADS multiple times, in both the parent space (above transform node) and a transform space (below the transform node). In some embodiments, the parent-child relationships are defined such that the GPU will transform the ray only if there is a hit in at least one of the bounding boxes above the transform node in the ADS. This avoids ray transform operations for other rays. Disclosed techniques may advantageously reduce power consumption, improve performance, or both by reducing ray transform operations, with relatively small increases in ADS size and bounding volume tests.

Graphics Processing Overview

Figure 1A:
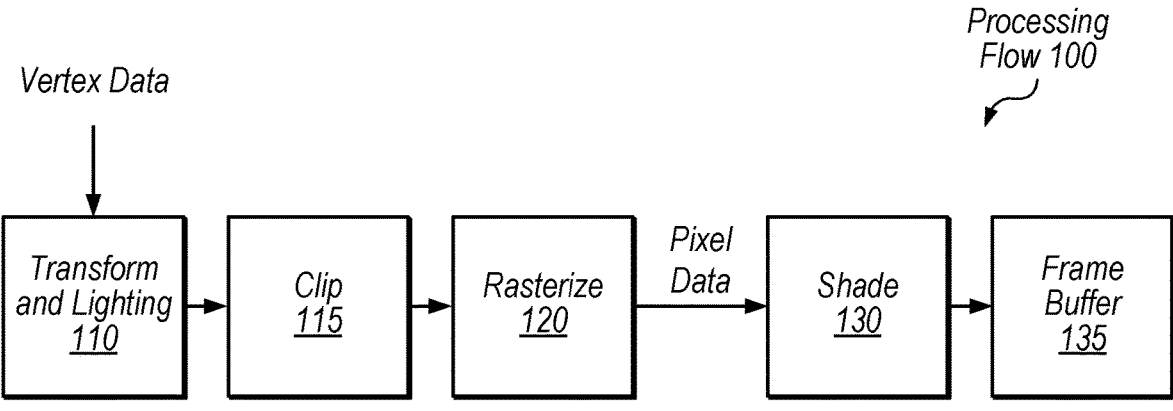
FIG. 1A is a diagram illustrating an overview of example graphics processing operations, according to some embodiments.

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. In some embodiments, geometry processing may utilize object shaders and mesh shaders for flexibility and efficient processing prior to rasterization. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
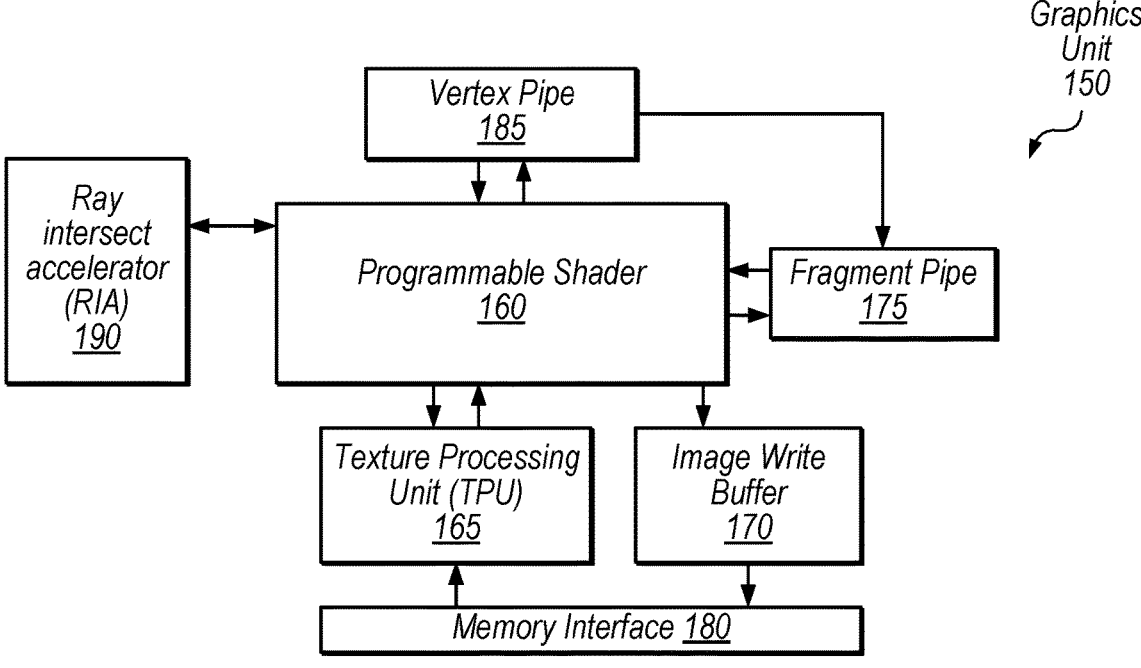
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. SIMD groups may also be referred to as SIMT (single-instruction, multiple-thread) groups, single instruction parallel thread (SIPT), or lane-stacked threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger threadgroup of threads that execute the same program, which may be broken up into a number of SIMD groups (within which threads may execute in lockstep) based on the parallel processing capabilities of a computer. In some embodiments, each thread is assigned to a hardware pipeline (which may be referred to as a "lane") that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

In the illustrated example, graphics unit 150 includes ray intersection accelerator (RIA) 190, which may include hardware configured to perform various ray intersection operations in response to instruction(s) executed by programmable shader 160, as described in detail below.

Overview of Bounding Volumes Defined in Multiple Spaces within an ADS

Figure 2:
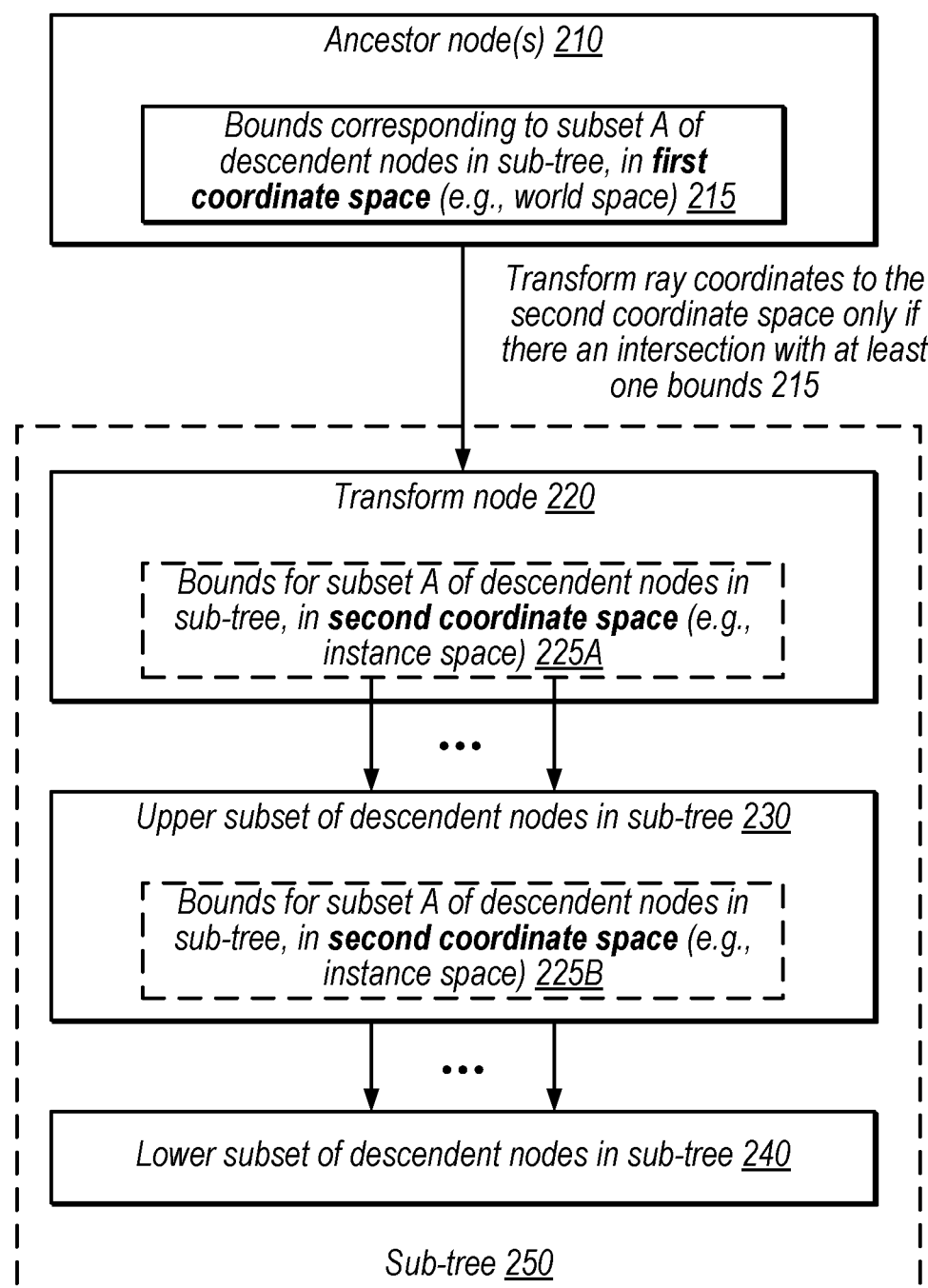
FIG. 2 is a diagram illustrating example inclusion in multiple spaces of a subset of bounding volumes of an ADS sub-tree, according to some embodiments.

FIG. 2 is a diagram illustrating example inclusion in multiple spaces of a subset of bounding volumes of an ADS sub-tree, according to some embodiments. As is well-understood by those of skill in the art, a processor may traverse the ADS for a given ray, e.g., using a depth-first search. Different rays may traverse different paths through the ADS, depending on which bounding boxes they intersect. In a depth-first search, when there are multiple hits at a given level, traversal proceeds down the tree for one of the hits and other hits at that level are pushed on to a traversal stack to potentially be revisited later in the traversal. The traversal procedure may end on different conditions for different types of traversals (e.g., an any-hit, closest-hit, etc.).

In the illustrated example, the ADS includes one or more ancestor nodes 210 and a sub-tree 250. As shown the sub-tree 250 includes a transform node 220, an upper subset of descendent nodes in the sub-tree, and a lower subset of descendent nodes in the sub-tree. (Note that the transform node 220 itself may or may not be considered part of the transform sub-tree, in different implementations).

Note that an instance node is one example of a transform node 220 and instance sub-tree is one example of an instance sub-tree. Instancing is discussed in detail herein for purposes of explaining certain embodiments. Disclosed techniques, however, may be used in the context of various different types of nodes that correspond to a ray transform operation, and are not limited to instancing techniques.

Ancestor node(s) 210, in the illustrated embodiment, include data that indicates bounds 215. Bounds 215 correspond to bounds 225A in transform node 220 and bounds 225B in the upper subset of descendent nodes 230. But, bounds 215 are defined in a first coordinate space (e.g., world space) while the corresponding bounds 225A and 225B are defined in a second coordinate space (e.g., an instance space). Therefore, certain bounds in the illustrated ADS are included multiple times in different coordinates spaces.

Note that bounds 215 may be included in multiple levels of the ADS in examples where ancestor node(s) 210 include nodes at multiple ADS levels.

As shown, based on detecting an intersection between a ray and one of the bounds 215, the graphics processor 150 is configured to transform ray coordinates to the second coordinate space in conjunction with traversal to transform node 220. In the illustrated embodiment, however, if there are no hits for bounds 215 for a given ray, the graphics processor 150 is configured not to transform coordinates of the ray and not traverse to transform node 220 (because of the correspondence of bounds 215 and 225A/225B, lack of any hits for bounds 215 may mean that there would not have been hits in any of bounds 225A/225B, such that transforming the ray was not needed). This may advantageously avoid using processing resources for such ray transforms.

Note that bounds 225A and 225B are shown using dashed lines to indicate that these bounds (corresponding to bounds 215 but in a different coordinate space) could be included in transform node 220 only, in descendent nodes 230, or in both. For example, if only child bounds of transform node 220 are included in bounds 215, then bounds 225B may be omitted. There are design tradeoffs associated with the number of levels of bounds included in bounds 215. For example, increasing the number of levels may increase the size of the ADS and number of bounding volume tests but reduce the number of ray transform operations, and vice versa).

In some embodiments, the number of levels of a sub-tree included in multiple spaces according to disclosed techniques is programmable. In some embodiments, the number of levels is selected based on characteristics of the sub-tree (e.g., the overall number of levels in the sub-tree, a branching factor, sizes of bounding volumes included in the nodes, number of primitives enclosed by the sub-tree, etc.).

As shown, the lower subset of descendent nodes 240 in the sub-tree do not have corresponding bounds in bounds 215 (although they do include bounding boxes associated with their child nodes, which are not shown). Thus, these nodes' bounds are not included multiple times in the ADS and do not increase the size of the ADS. Therefore, disclosed techniques may advantageously reduce ray transform operations with limited increases in ADS size.

Further note that there may not be a one-to-one mapping between a bounds 215 and a bounds 225A or 225B. Rather, in some embodiments, a bounds 215 might correspond to two or more bounds 225A, for example, (such that a transform of the bounds 215 to the second coordinate space would result in the same bounding volume as a combination of bounding volumes indicated by the two or more corresponding bounds 225A). In these embodiments, the bounds 215 may still specify smaller bounding volumes than a bounding volume corresponding to transform node 220 (which is non-typical, because traditionally bounding volumes are typically greater in size at higher levels of a BVH tree).

Note that various disclosed techniques may be implemented by shader programs executed by programmable shader 160, implemented by RIA 190, or some combination thereof. For example, programmable shader 160 may execute a program to generate an acceleration data structure and then execute intersect_ray instructions to initiate traversal of an ADS by RIA 190. RIA 190 may traverse the ADS according to disclosed techniques and may launch a SIMD group on programmable shader 160 to transform one or more rays or may transform rays internally. RIA 190 may return traversal results in the form of one or more primitives to be tested for a given ray or in the form of primitive intersect test results, depending on the level of hardware acceleration in a given implementation.

Example Instance Transforms and Bounds Implementations

Figure 3:
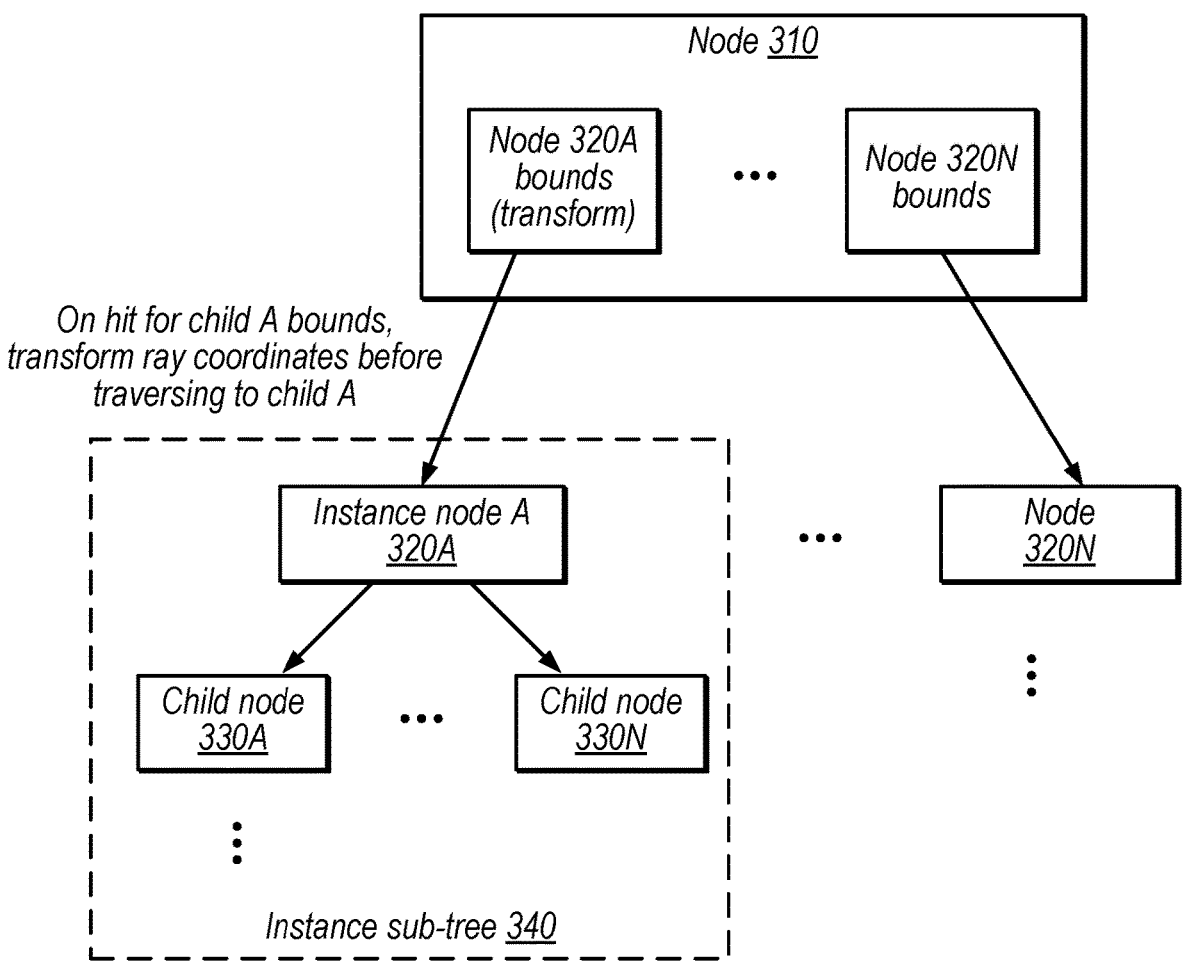
FIG. 3 is a diagram illustrating an example instance node, according to some embodiments.

FIG. 3 is a diagram illustrating an example instance node, according to some embodiments. In the illustrated example, node 310 includes bounds for child nodes 320A-320N. Note that unlike FIG. 2, the example of FIG. 3 does not include bounds for sub-tree 340 in multiple spaces.

Because node 320A is an instance node, the processor transforms ray coordinates when traversing to node A (when there is a hit in the bounds for node 320A). Instance node 320A in turn has child nodes 330A-330N in an instance sub-tree 340. As discussed above, if there were not hits for a ray in bounding boxes corresponding to child nodes 330A or 330N, the transform of the ray would be wasted.

Figure 4:
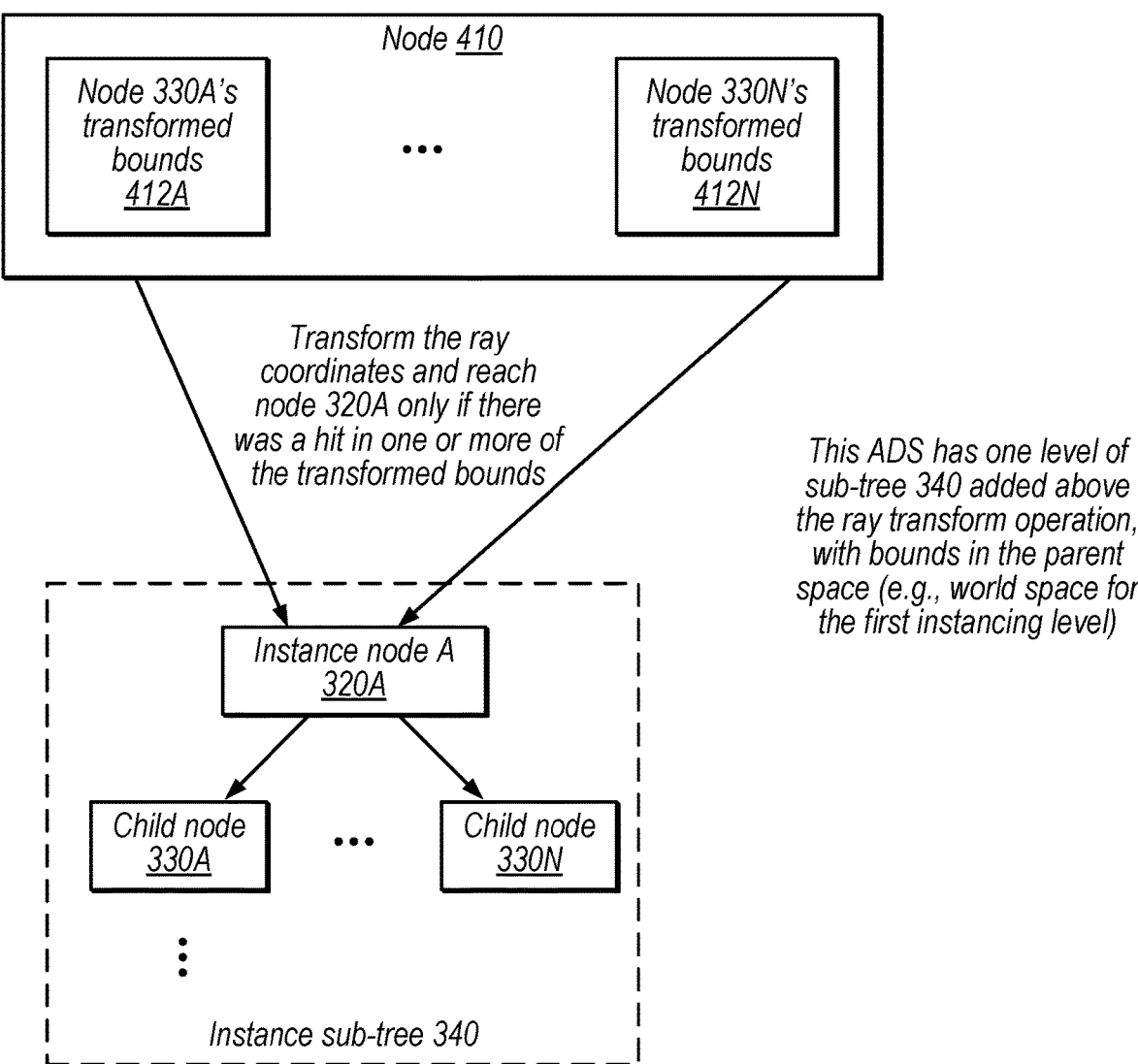
FIG. 4 is a diagram illustrating example transformation of a subset of nodes of an instance sub-tree, according to some embodiments.

FIG. 4 is a diagram illustrating example transformation of a subset of nodes of an instance sub-tree, according to some embodiments. In the illustrated example, an ADS includes node 410 and instance sub-tree 340, which includes instance node A 320A and child nodes 330A-330N (similarly to FIG. 3).

Node 410, in the illustrated example, includes bounds 412A-412N corresponding to child nodes 330A-330N, but transformed from the sub-tree space to the parent space (e.g., world space, if this is not a nested instance or a higher-level instance space for a nested instance). As shown, the graphics processor is configured to transform the ray coordinates and reach instance node A 320A only if there is a hit in at least one of transformed bounds 412A-412N. Note that the bounds of node 410 may themselves also correspond to the bounds of instance node A, such that traversal reaches node 410 only in situations where traversal will proceed to at least node 320A. In this example, bounding boxes for one child level of the instance sub-tree 340 are included in both the parent space and the transform space.

Note that 412A-412N are described as "transformed" in the illustrated example, which implies that the graphics processor started with the bounds corresponding to child nodes 330A-330N and transformed them back to the parent space. In other embodiments, however, the bounds may be determined initially in world space and transformed to instance space for inclusion in the instance sub-tree. In still other embodiments, the bounding boxes in the different spaces may be determined independently, with no actual transform operation performed on coordinates for a given bounding box. Further note that any costs of transforming/generating bounding boxes may be amortized over many rays (e.g., because the ADS is traversed by many rays while a transformation of a given ray may be relevant only to that ray).

Note that the transformed bounds (e.g., 412A-412N) may not exactly correspond to the bounds of the child nodes (e.g., 330A-330N), in some embodiments. As one example, for an instance node with N child nodes, the system might generate a smaller number of transformed bounds (e.g., where each transformed bounds corresponded to bounds for multiple child nodes 330). For four child nodes, for example, two transformed bounds might be created, with the bounding volume of each transformed bounds corresponding to two of the child nodes. Generally, the bounding volume of a transformed node (in the parent space) may spatially correspond to the bounding volume(s) defined by one or more child nodes (in the child space). Various other mappings of transformed bounds to child bounds in the instance sub-tree are contemplated. This may reduce the granularity at which transformed bounds are checked to determine whether to enter the sub-tree, but may still avoid entering the instance sub-tree in various scenarios.

Further, in some embodiments, a transformed bounding volume 412 may point directly to the corresponding child node 330. This may allow direct traversal to the child node, e.g., instead of first traversing to the instance node 320 (although the ray transform may still occur). This may reduce redundant ray-box intersection tests, in some embodiments.

While bounding boxes are discussed for purposes of illustration, various shapes of bounding volumes may be implemented in other embodiments. Further, a given bounding volume may be shaped differently in different coordinate spaces, depending on the associated transform.

Figure 5:
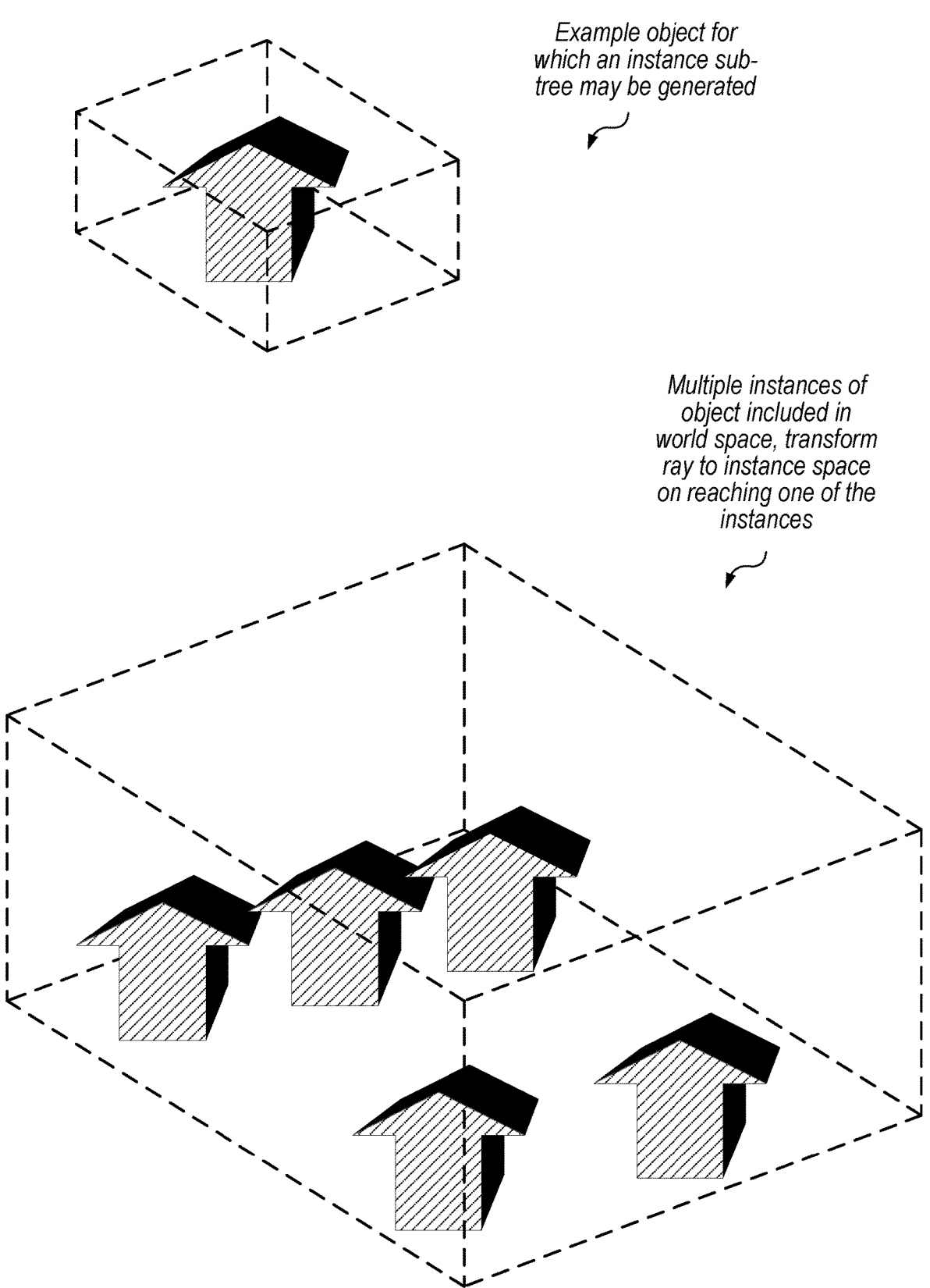
FIG. 5 is a diagram illustrating the general concept of multiple example instances of an object, according to some embodiments.

FIG. 5 is a diagram the general concept of multiple example instances of an object, according to some embodiments. The upper portion of FIG. 5 shows an object in a three-dimensional instance space. The graphics processor may generate an instance sub-tree in the ADS corresponding to this object. As shown in the lower portion of FIG. 5, the object may have multiple instances included in world space and the graphics processor may transform a ray to an instance space on reaching one of the instances.

In some embodiments, intersection circuitry is configured to traverse a BVH ADS that uses 3D axis-aligned boxes for its bounding volumes. The ADS may have a maximum branching factor (e.g., 2, 4, 8, 16, etc.) and a flexible user-defined payload (e.g., the contents at the leaves of the tree) that does not presume triangle geometry. Example node structures are discussed in U.S. patent application Ser. No. 17/103,317, filed Nov. 24, 2020, and titled "Grouping Techniques for Ray Intersection Traversal," which is incorporated by reference herein in its entirety.

For example, a node data structure may include bounds 0-N for multiple bounding volumes associated with children of the node, metadata for each bounding volume, an opcode, exponent information, origin information, child base information, status information, and shader index information. Bounds 0-N, in some embodiments, define the bounding volumes corresponding to up to N–1 child nodes. In some embodiments, these are quantized, axis-aligned bounding boxes that are defined by their upper and lower corners (e.g., with six values per box in an X, Y, Z, coordinate space). In some embodiments, these values are represented as fixed-point offsets relative to a common origin (specified by the origin X, Y, Z fields) and scale factor (e.g., a power-of-2 scale factor specified by the exponent X, Y, Z fields). The origin values may be represented as signed floating-point values, for example. This may allow encoding of all child nodes relative to parent bounds, which may avoid progressive loss of precision as the boxes become smaller in deeper parts of the tree. The parent container—the origin and exponents—may be referred to as the quantization frame for the node.

Information indicating each bounding volume may be referred to as a child and may indicate an interior child, leaf child, or invalid child. The status and contents of a given child may be determined jointly based on its corresponding metadata field and status field. For example, the status field may include a bit per child that indicates whether the child is an interior node or leaf node. As another example, the status field may separately encode the number of interior nodes and the number of leaf nodes. The metadata field may indicate whether children are invalid.

In some embodiments, bounds coordinates are quantized to six, seven, or eight bits per coordinate, for example, which results in a 36, 42, or 48-bit bounds field to represent six coordinates that define a box-shaped bounding volume. In some embodiments, the quantization techniques that generate quantized coordinate values (from initial values that may be represented using greater numbers of bits) ensure that there may be false positive intersection results, but not false negatives. For example, the quantization may be performed in such a manner that quantized box representations are larger than or equal to non-quantized box representations. For example, the quantization arithmetic may be configured to round in different directions for each corner (in directions that corresponds to expanding the box if rounding is performed). This may advantageously reduce the amount of data used per node without affecting accuracy and with limited increases in testing during traversal.

As discussed above, bounding boxes may be transformed from one space to another for inclusion in multiple coordinate spaces or may be independently generated in different coordinate spaces. Transform between spaces may include performing arithmetic operations on the X, Y, and Z coordinates for the upper and lower corners of a bounding box. The transform may alternatively generate new X, Y, and Z values based on a common origin for a new parent node. The transform may include adjusting a scale factor based on the target coordinate space. The bounding box may or may not be specified in the same precision in the different coordinate spaces. Any loss of precision may be conservative, however, such that a miss in the parent space is guaranteed to be a miss for the child space. Generally, various types of transforms may be implemented and may adjust the size, orientation, shape, etc. of transformed bounding volumes or rays.

Example ADS Construction Methods

Figure 6:
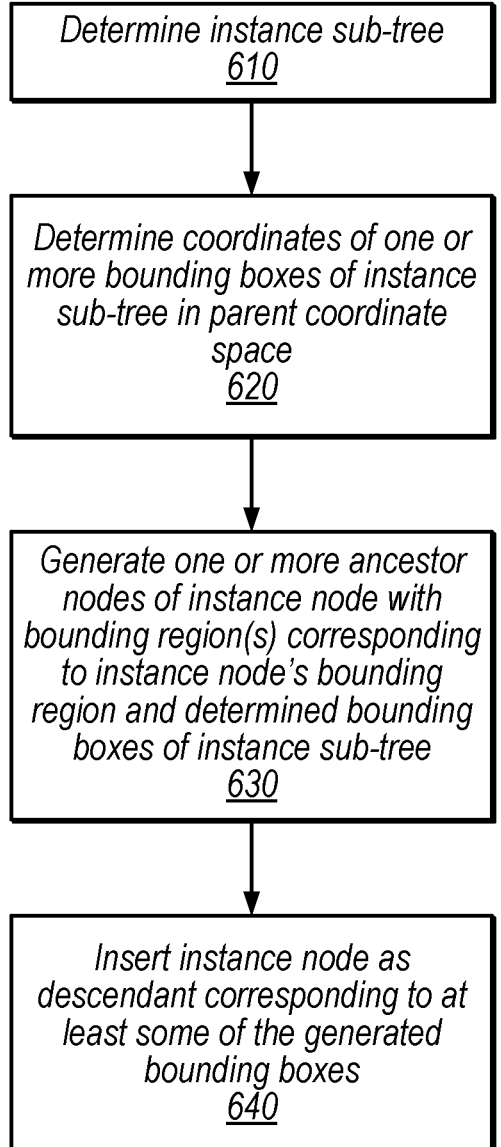
FIG. 6 is a diagram illustrating a detailed example method for generating an ADS, according to some embodiments.

FIG. 6 is a flow diagram illustrating an example detailed technique for generating an ADS with a subset of bounding boxes included in multiple spaces, according to some embodiments. The elements of FIG. 6 may be performed by one or more hardware components, e.g., by shader programs executed by a shader processor 160 according to an application programming interface (API), by GPU firmware executed by a firmware processor of the GPU, by fixed-function ADS construction hardware, etc.

At 610, in the illustrated example, the processor determines an instance sub-tree. The sub-tree may be for a particular mesh or object in the scene. The sub-tree may have multiple levels. The root node of the sub-tree may be an instance/transform node.

At 620, in the illustrated embodiment, the processor determines coordinates of one or more bounding boxes of the instance sub-tree in a parent coordinate space. This may include the transform node and one or more levels below the transform node, for example. This may include transforming coordinates already determined in the child space or independently generating the coordinates. As discussed above, the transformed bounding boxes in the parent coordinate space may not have a one-to-one relationship with bounding boxes it the child space.

At 630, in the illustrated embodiment, the processor generates one or more ancestor nodes of the instance node with one or more child bounding volumes corresponding to the instance node's bounding volume (e.g., bounds corresponding to ancestor node(s) 210) and the determined bounding boxes of part of the instance sub-tree (e.g., bounds 215).

At 640, in the illustrated embodiment, the processor inserts the instance node as a descendent corresponding to at least some of the generated bounding boxes. Parent/child relationships may be specified differently in different embodiments. Therefore, this may include updating a pointer to indicate the instance node, placing a data structure for the instance node at a certain address relative to a base address or parent node address, etc. The processor may also properly configure one or more other bounding boxes determined at element 620. This may allow proper traversal (e.g., traversal to the instance node only in situations where a ray intersects one of the bounding volumes within a certain number of levels of the instance node).

FIG. 7 is a flow diagram illustrating an example method for generating an ADS, according to some embodiments. The method shown in FIG. 7 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 710, in the illustrated embodiment, a processor accesses graphics data that indicates coordinates of primitives in a graphics scene.

At 720, in the illustrated embodiment, the processor generates, based on the graphics data, a bounding volume hierarchy (BVH) acceleration data structure (ADS). In the illustrated embodiment, the ADS includes: a transform node (e.g., node 220), one or more ancestor nodes of the transform node (e.g., node(s) 210) that define bounding volumes in a first coordinate space, and levels of descendent nodes (e.g., levels that include nodes 230 and 240) of the transform node that define bounding volumes in a second coordinate space. In the illustrated example, the one or more ancestor nodes define, in the first coordinate space, one or more first bounding volumes (e.g., a bounds 215), where a given volume of the one or more first bounding volumes: is smaller than a bounding volume corresponding to the transform node and corresponds to one or more bounding volumes defined at one or more of the levels of the descendent nodes (e.g., one or more bounds 225A or 225B).

In some embodiments, the first one or more bounding volumes include bounding volumes corresponding to multiple levels of the levels of descendant nodes. In some embodiments, the first coordinate space is a world space and the second coordinate space is an instance space. In some embodiments, the first one or more bounding volumes are included in an ancestor node that corresponds to the same bounding volume as the transform node (e.g., as shown in the example of FIG. 4).

In some embodiments, the processor is configured to determine a number of levels of descendent nodes having bounding volumes corresponding to the first one or more bounding volumes based on one or more characteristics of the levels of descendent nodes (e.g., the overall number of levels in the sub-tree, a branching factor, sizes of bounding volumes included in the nodes, etc.).

At 730, in the illustrated embodiment, the processor traverses the ADS including to determine whether to traverse to the levels of descendent nodes based on whether there are any intersections between a ray and bounding volumes defined by the one or more ancestor nodes.

In some embodiments, the processor is configured to transform coordinates of a given ray to the second coordinate space and traverse the ADS to the transform node only in response to a determination of an intersect between the given ray and at least one of the one or more first bounding volumes. Therefore, the processor may be configured to skip traversal of the transform node for the given ray in response to a determination that the given ray does not intersect any of the one or more first bounding volumes.

At 740, in the illustrated embodiment, the processor determines one or more primitives to test for intersection by the ray based on the traversal. For example, the traversal may reach one or more BVH leaf nodes that identify primitives for testing.

In some embodiments, the processor includes execution circuitry configured to execute one or more programs to generate the ADS and dedicated ray intersect circuitry configured to traverse the ADS, including to test a given ray for intersection with multiple bounding volumes in parallel.

Example Device

Figure 8:
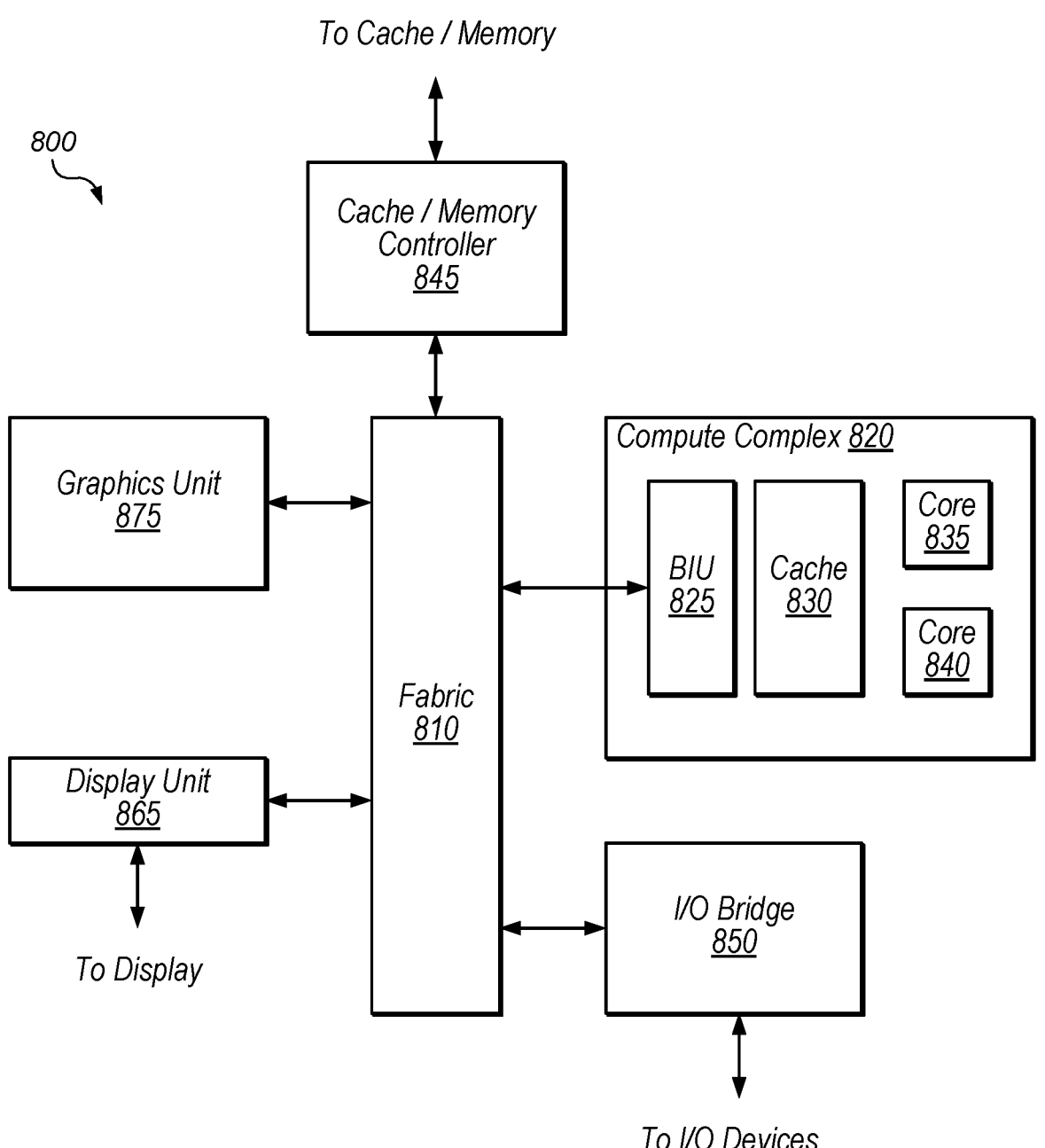
FIG. 8 is a block diagram illustrating an example computing device, according to some embodiments.

Referring now to FIG. 8, a block diagram illustrating an example embodiment of a device 800 is shown. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820 input/output (I/O) bridge 850, cache/memory controller 845, graphics unit 875, and display unit 865. In some embodiments, device 800 may include other components (not shown) in addition to or in place of the illustrated components, such as video processor encoders and decoders, image processing or recognition elements, computer vision elements, etc.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of processors, processor cores and caches. For example, compute complex 820 may include 1, 2, or 4 processor cores, or any other suitable number. In one embodiment, cache 830 is a set associative L2 cache. In some embodiments, cores 835 and 840 may include internal instruction and data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions. These instructions may be stored in computer readable medium such as a memory coupled to memory controller 845 discussed below.

As used herein, the term "coupled to" may indicate one or more connections between elements, and a coupling may include intervening elements. For example, in FIG. 8, graphics unit 875 may be described as "coupled to" a memory through fabric 810 and cache/memory controller 845. In contrast, in the illustrated embodiment of FIG. 8, graphics unit 875 is "directly coupled" to fabric 810 because there are no intervening elements.

Cache/memory controller 845 may be configured to manage transfer of data between fabric 810 and one or more caches and memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches. Memory coupled to controller 845 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 845 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 820 to cause the computing device to perform functionality described herein.

Graphics unit 875 may include one or more processors, e.g., one or more graphics processing units (GPUs). Graphics unit 875 may receive graphics-oriented instructions, such as OPENGL®, Metal®, or DIRECT3D® instructions, for example. Graphics unit 875 may execute specialized GPU instructions or perform other operations based on the received graphics-oriented instructions. Graphics unit 875 may generally be configured to process large blocks of data in parallel and may build images in a frame buffer for output to a display, which may be included in the device or may be a separate device. Graphics unit 875 may include transform, lighting, triangle, and rendering engines in one or more graphics processing pipelines. Graphics unit 875 may output pixel information for display images. Graphics unit 875, in various embodiments, may include programmable shader circuitry which may include highly parallel execution cores configured to execute graphics programs, which may include pixel tasks, vertex tasks, and compute tasks (which may or may not be graphics-related).

In some embodiments, disclosed techniques implemented by graphics unit 875 may improve performance for ray tracing, reduce ray tracing power consumption, or both, relative to traditional techniques.

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and low-power always-on functionality, for example. I/O bridge 850 may also include interfaces such as pulse-width modulation (PWM), general-purpose input/output (GPIO), serial peripheral interface (SPI), and inter-integrated circuit (I2C), for example. Various types of peripherals and devices may be coupled to device 800 via I/O bridge 850.

In some embodiments, device 800 includes network interface circuitry (not explicitly shown), which may be connected to fabric 810 or I/O bridge 850. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 800 with connectivity to various types of other devices and networks.

Example Applications

Figure 9:
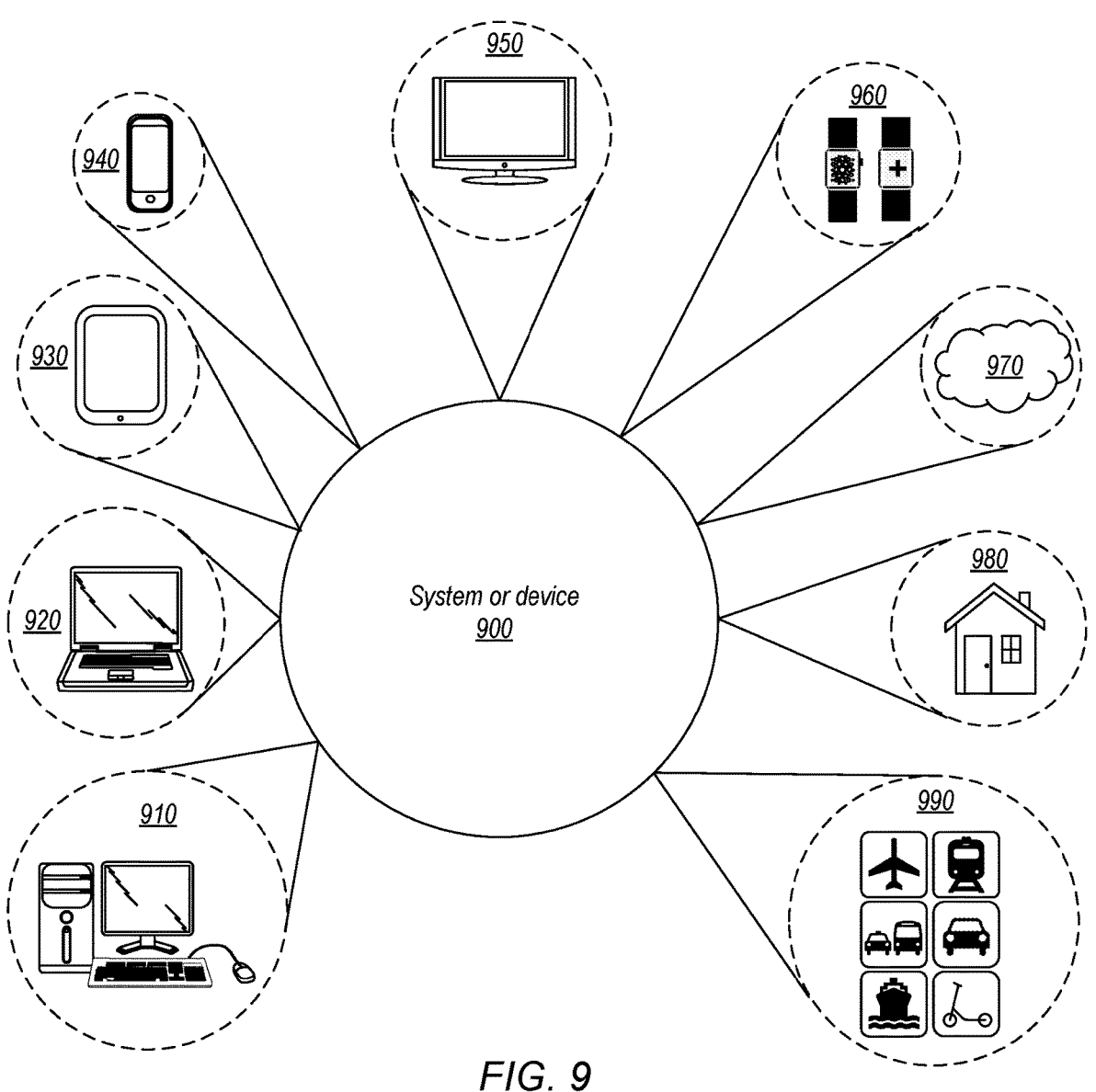
FIG. 9 is a diagram illustrating example applications of disclosed systems and devices, according to some embodiments.

Turning now to FIG. 9, various types of systems that may include any of the circuits, devices, or system discussed above. System or device 900, which may incorporate or otherwise utilize one or more of the techniques described herein, may be utilized in a wide range of areas. For example, system or device 900 may be utilized as part of the hardware of systems such as a desktop computer 910, laptop computer 920, tablet computer 930, cellular or mobile phone 940, or television 950 (or set-top box coupled to a television).

Similarly, disclosed elements may be utilized in a wearable device 960, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 900 may also be used in various other contexts. For example, system or device 900 may be utilized in the context of a server computer system, such as a dedicated server or on shared hardware that implements a cloud-based service 970. Still further, system or device 900 may be implemented in a wide range of specialized everyday devices, including devices 980 commonly found in the home such as refrigerators, thermostats, security cameras, etc. The interconnection of such devices is often referred to as the "Internet of Things" (IoT). Elements may also be implemented in various modes of transportation. For example, system or device 900 could be employed in the control systems, guidance systems, entertainment systems, etc. of various types of vehicles 990.

The applications illustrated in FIG. 9 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 10:
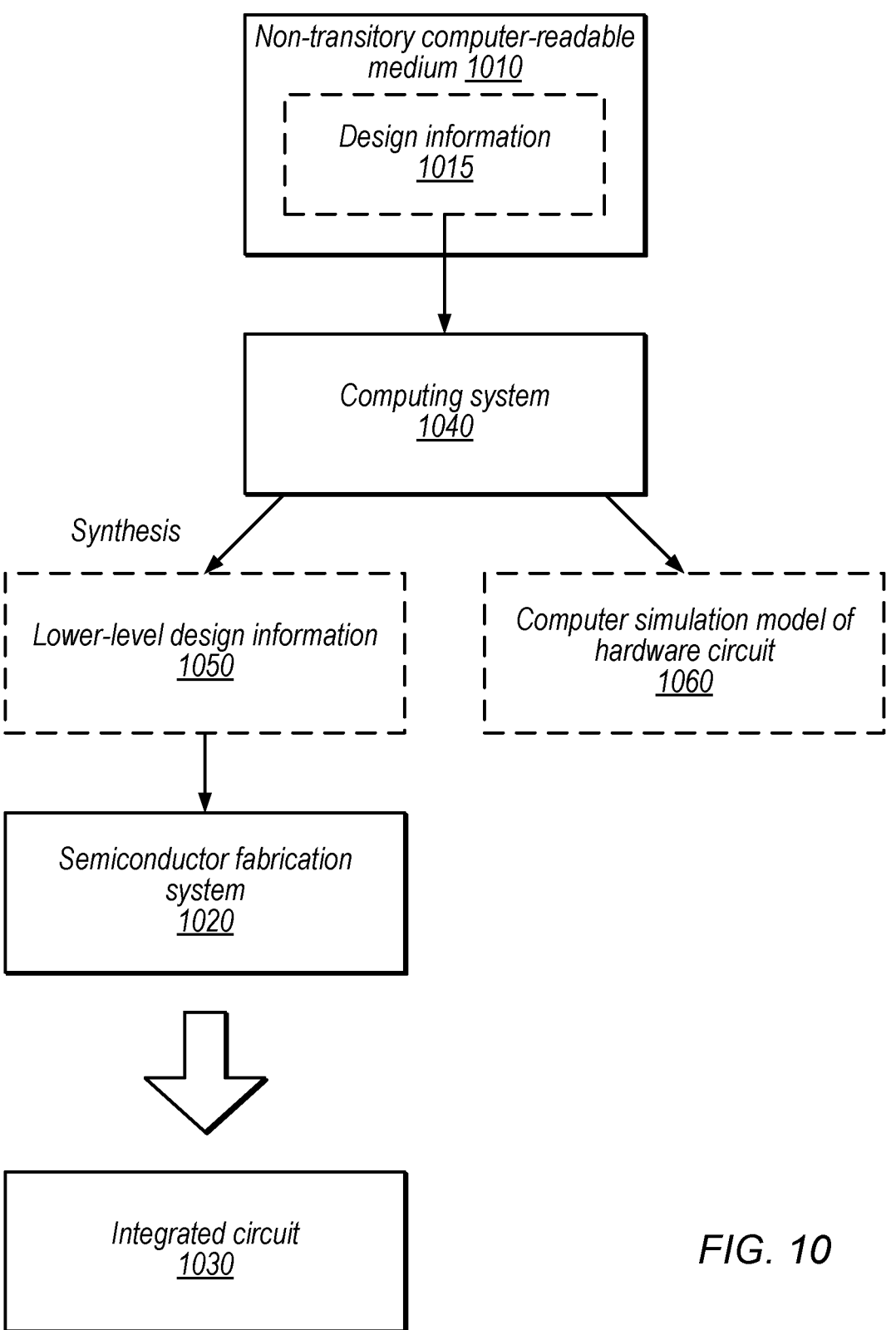
FIG. 10 is a block diagram illustrating an example computer-readable medium that stores circuit design information, according to some embodiments.

FIG. 10 is a block diagram illustrating an example non-transitory computer-readable storage medium that stores circuit design information, according to some embodiments. In the illustrated embodiment, computing system 1040 is configured to process the design information. This may include executing instructions included in the design information, interpreting instructions included in the design information, compiling, transforming, or otherwise updating the design information, etc. Therefore, the design information controls computing system 1040 (e.g., by programming computing system 1040) to perform various operations discussed below, in some embodiments.

In the illustrated example, computing system 1040 processes the design information to generate both a computer simulation model of a hardware circuit 1060 and lower-level design information 1050. In other embodiments, computing system 1040 may generate only one of these outputs, may generate other outputs based on the design information, or both. Regarding the computing simulation, computing system 1040 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1040 also processes the design information to generate lower-level design information 1050 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1050 (potentially among other inputs), semiconductor fabrication system 1020 is configured to fabricate an integrated circuit 1030 (which may correspond to functionality of the simulation model 1060). Note that computing system 1040 may generate different simulation models based on design information at various levels of description, including information 1050, 1015, and so on. The data representing design information 1050 and model 1060 may be stored on medium 1010 or on one or more other media.

In some embodiments, the lower-level design information 1050 controls (e.g., programs) the semiconductor fabrication system 1020 to fabricate the integrated circuit 1030. Thus, when processed by the fabrication system, the design information may program the fabrication system to fabricate a circuit that includes various circuitry disclosed herein.

Non-transitory computer-readable storage medium 1010, may comprise any of various appropriate types of memory devices or storage devices. Non-transitory computer-readable storage medium 1010 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1010 may include other types of non-transitory memory as well or combinations thereof. Accordingly, non-transitory computer-readable storage medium 1010 may include two or more memory media; such media may reside in different locations—for example, in different computer systems that are connected over a network.

Design information 1015 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 1040, semiconductor fabrication system 1020, or both. In some embodiments, design information may also include one or more cell libraries that specify the synthesis, layout, or both of integrated circuit 1030. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1030 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform various testing of fabricated circuits for correct operation.

In various embodiments, integrated circuit 1030 and model 1060 are configured to operate according to a circuit design specified by design information 1015, which may include performing any of the functionality described herein. For example, integrated circuit 1030 may include any of various elements shown in the figures. Further, integrated circuit 1030 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1020 to fabricate integrated circuit 1030.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:
1. An apparatus, comprising:
   processor circuitry configured to:
      access graphics data that indicates coordinates of primitives in a graphics scene;
      generate, based on the graphics data, a bounding volume hierarchy (BVH) acceleration data structure (ADS) that includes:

a transform node;

one or more ancestor nodes, of the transform node, that define bounding volumes in a first coordinate space; and levels of descendent nodes, of the transform node, wherein the descendent nodes define bounding volumes in a second coordinate space, wherein the bounding volumes in the second coordinate space include a first bounding volume and one or more of the ancestor nodes define, in the first coordinate space, a copy of the first bounding volume, wherein the copy corresponds to a transform of the first bounding volume from the second coordinate space to the first coordinate space and wherein the first bounding volume is smaller than a bounding volume corresponding to the transform node;

traverse the ADS, including to determine whether to traverse to the levels of descendent nodes based on whether there are any intersections between a ray and the bounding volumes defined by the one or more ancestor nodes, including whether there was an intersection between the ray and the copy of the first bounding volume; and determine one or more primitives to test for intersection by the ray based on the traversal.

2. The apparatus of claim 1, wherein the processor circuitry is configured to:

transform coordinates of a first ray to the second coordinate space and traverse the ADS to the transform node in response to a determination of an intersect between the first ray and at least one copy of a bounding volume defined by the ancestor nodes;

skip traversal of the transform node for a second ray based on a determination that the second ray does not intersect the first bounding volume.

3. The apparatus of claim 1, wherein the processor circuitry includes:

execution circuitry configured to execute one or more programs to generate the ADS; and dedicated ray intersect circuitry configured to traverse the ADS, including to test the ray for intersection with multiple bounding volumes in parallel.

4. The apparatus of claim 1, wherein the ancestor nodes further define, in the first coordinate space, copies of bounding volumes from multiple levels of the levels of descendant nodes.

5. The apparatus of claim 1, wherein the first coordinate space is a world space and the second coordinate space is an instance space.

6. The apparatus of claim 1, wherein the first bounding volume is included in an ancestor node that corresponds to the same bounding volume as the transform node.

7. The apparatus of claim 1, wherein the processor circuitry is configured to determine a number of levels of descendent nodes having copies of bounding volumes stored in ancestor nodes based on one or more characteristics of the levels of descendent nodes.

8. The apparatus of claim 1, wherein at least a first node of the one or more ancestor nodes includes link information for traversal directly from the first node to one of the descendent nodes.

9. The apparatus of claim 1, wherein the apparatus is a computing device that further includes:

a central processing unit;

a display; and network interface circuitry.

10. A method, comprising:

accessing, by a computing system, graphics data that indicates coordinates of primitives in a graphics scene;

generating, by the computing system based on the graphics data, a bounding volume hierarchy (BVH) acceleration data structure (ADS) that includes:

a transform node;

one or more ancestor nodes, of the transform node, that define bounding volumes in a first coordinate space; and levels of descendent nodes, of the transform node, wherein the descendent nodes define bounding volumes in a second coordinate space, wherein the bounding volumes in the second coordinate space include a first bounding volume and one or more of the ancestor nodes define, in the first coordinate space, a copy of the first bounding volume, wherein the copy corresponds to a transform of the first bounding volume from the second coordinate space to the first coordinate space and wherein the first bounding volume is smaller than a bounding volume corresponding to the transform node; traversing, by the computing system, the ADS, including determining whether to traverse to the levels of descendent nodes based on whether there are any intersections between a ray and the bounding volumes defined by the one or more ancestor nodes, including whether there was an intersection between the ray and the copy of the first bounding volume; and determining one or more primitives to test for intersection by the ray based on the traversal.

11. The method of claim 10, further comprising:

skipping, by the computing system, traversal of the transform node for the ray based on a determination that the ray does not intersect the first bounding volume.

12. The method of claim 10, wherein the one or more ancestor nodes further define, in the first coordinate space, copies of bounding volumes from multiple levels of the levels of descendant nodes.

13. The method of claim 10, wherein the first coordinate space is a first instance space and the second coordinate space is a second instance space.

14. The method of claim 10, wherein the first bounding volume is included in an ancestor node that corresponds to the same bounding volume as the transform node.

15. A non-transitory computer-readable medium having instructions stored thereon that are executable by a computing device to perform operations comprising:

accessing, by a computing system, graphics data that indicates coordinates of primitives in a graphics scene;

generating, by the computing system based on the graphics data, a bounding volume hierarchy (BVH) acceleration data structure (ADS) that includes:

a transform node;

one or more ancestor nodes, of the transform node, that define bounding volumes in a first coordinate space; and levels of descendent nodes, of the transform node, wherein the descendent nodes define bounding volumes in a second coordinate space, wherein the bounding volumes in the second coordinate space include a first bounding volume and one or more of the ancestor nodes define, in the first coordinate space, a copy of the first bounding volume, wherein the copy corresponds to a transform of the first bounding volume from the second coordinate space to the first coordinate space and wherein the first bounding volume is smaller than a bounding volume corresponding to the transform node; traversing, by the computing system, the ADS, including determining whether to traverse to the levels of descendent nodes based on whether there are any intersections between a ray and the bounding volumes defined by the one or more ancestor nodes, including whether there was an intersection between the ray and the copy of the first bounding volume; and determining one or more primitives to test for intersection by the ray based on the traversal.

16. The non-transitory computer-readable medium of claim 15, wherein the operations further comprise:

skipping traversal of the transform node for the ray based on a determination that the ray does not intersect the first bounding volume.

17. The non-transitory computer-readable medium of claim 15, wherein the one or more ancestor nodes further define, in the first coordinate space, copies of bounding volumes from multiple levels of the levels of descendant nodes.

18. The non-transitory computer-readable medium of claim 15, wherein the first coordinate space is a first instance space and the second coordinate space is a second instance space.

19. The non-transitory computer-readable medium of claim 15, wherein the first bounding volume is included in an ancestor node that corresponds to the same bounding volume as the transform node.

20. The non-transitory computer-readable medium of claim 15, wherein the operations further comprise:

determining a number of levels of descendent nodes having copies of bounding volumes stored in ancestor nodes based on one or more characteristics of the levels of descendent nodes.

\* \* \* \* \*